United States Patent
Fan et al.

(10) Patent No.: US 11,880,443 B2
(45) Date of Patent: Jan. 23, 2024

(54) SENSING APPARATUS AND KEYCAP

(71) Applicant: Carewe Technology Corp., Taipei (TW)

(72) Inventors: Hsien-Lung Fan, Taipei (TW); Chih-Chung Chiang, Taipei (TW)

(73) Assignee: CAREWE TECHNOLOGY CORP., Taipei (TW)

( * ) Notice: Subject to any disclaimer, the term of this patent is extended or adjusted under 35 U.S.C. 154(b) by 0 days.

(21) Appl. No.: 17/726,963

(22) Filed: Apr. 22, 2022

(65) Prior Publication Data

US 2022/0342968 A1  Oct. 27, 2022

(30) Foreign Application Priority Data

Apr. 23, 2021  (TW) ................. 110114803

(51) Int. Cl.
  *G06V 40/13*  (2022.01)
  *G06F 21/32*  (2013.01)
  *G06F 3/041*  (2006.01)

(52) U.S. Cl.
  CPC ............ *G06F 21/32* (2013.01); *G06F 3/0414* (2013.01); *G06F 3/04164* (2019.05); *G06V 40/13* (2022.01); *G06F 2203/04105* (2013.01)

(58) Field of Classification Search
  CPC .... G06F 21/32; G06F 3/0414; G06F 3/04164; G06F 2203/04105; G06F 3/021; G06V 40/13
  See application file for complete search history.

(56) References Cited

U.S. PATENT DOCUMENTS

| | | | |
|---|---|---|---|
| 2015/0234499 A1 | 8/2015 | Hu et al. | |
| 2019/0019006 A1* | 1/2019 | Xu | .......... H01L 24/16 |
| 2019/0073045 A1* | 3/2019 | Lei | ......... H01H 13/705 |
| 2019/0122022 A1* | 4/2019 | Wu | .......... G06V 40/1329 |

FOREIGN PATENT DOCUMENTS

| | | |
|---|---|---|
| CN | 103076987 A | 5/2013 |
| TW | 201533630 A | 9/2015 |
| TW | M529929 U | 10/2016 |
| TW | M579755 U | 6/2019 |
| TW | M583571 U | 9/2019 |
| TW | M616006 U | 8/2021 |

* cited by examiner

*Primary Examiner* — Jonathan A Boyd
(74) *Attorney, Agent, or Firm* — Birch, Stewart, Kolasch & Birch, LLP

(57) ABSTRACT

The present invention provides a sensing device and a keycap. The sensing device includes a sensing unit and a base unit. The sensing unit includes a first sensing unit surface having a binding area and a non-binding area, wherein the binding area and the non-binding area do not overlap with each other and correspond to each other in shape. The base unit includes a first base unit surface having a contact area and a non-contact area, wherein the contact area and the non-contact area do not overlap with each other and correspond to each other in shape. The sensing unit is attached to the contact area of the base unit by the binding area; and sides of the sensing unit and the base unit side are flush with each other. The sensing device can function as a keycap.

20 Claims, 16 Drawing Sheets

US 11,880,443 B2

SENSING APPARATUS AND KEYCAP

BACKGROUND OF THE INVENTION

1. Field of the Invention

The present invention relates to a sensing device and a keycap. Specifically, the present invention relates to a sensing device capable of functioning as a keycap, and a keycap capable of functioning as a sensing device.

2. Description of the Prior Art

In the field of information and communication, biometrics (e.g., fingerprint) are used for user identity authentication, which is a widely used authentication method in electronic products. Taking fingerprint identification as an example, the conventional fingerprint sensing device is an external device independent of the electronic product. Even the built-in fingerprint sensing device is still an independent element with a single function (e.g., fingerprint, identification) in the electronic product, and requires additional internal space in the electronic product. How to integrate the sensing device that can capture user's biometrics with the existing components of the electronic product to reduce the required internal space of the electronic product and provide a compact and integrally formed appearance is one of the problem to be solved by the information and communication industry.

SUMMARY OF THE INVENTION

One object of present invention is to provide a sensing device capable of functioning as a keycap, which can provide functions such as key-in and biometric (e.g. fingerprint) sensing of electronic devices and has a compact and integrally formed appearance.

Another object of present invention is to provide a keycap capable of functioning as a sensing device, which can provide functions such as key-in and biometric (e.g., fingerprint) sensing of electronic devices and has a compact and integrally formed appearance.

In one embodiment, the present invention provides a sensing device including a sensing unit and a base unit. The sensing unit includes a first sensing unit surface having a binding area and a non-binding area, wherein the binding area and the non-binding area do not overlap with each other and correspond to each other in shape. The base unit includes a first base unit surface having a contact area and a non-contact area, wherein the contact area and the non-contact area do not overlap with each other and correspond to each other in shape. The sensing unit is attached to the contact area of the base unit by the binding area, and sides of the sensing unit and the base unit are flush with each other.

In another embodiment, the present invention provides a sensing device including a sensing unit, a base unit, and a circuit board. The sensing unit has a binding area, a sensing accommodation space, and a plurality of electrical contacts accommodated in the sensing accommodation space. The base unit has a contact area and a non-contact area. The circuit board disposed corresponding to the non-contact area. The sensing unit and the base unit are combined by connecting the binding area and the non-contact area, and the plurality of electrical contacts are electrically connected to the circuit board through the non-contact area.

In another embodiment, the present invention provides a keycap including a sensing unit and a base unit. The sensing unit includes a first sensing unit surface having a binding area and a non-binding area, wherein the binding area and the non-binding area do not overlap with each other and correspond to each other in shape. The base unit includes a first base unit surface having a contact area and a non-contact area, wherein the contact area and the non-contact area do not overlap with each other and correspond to each other in shape. The sensing unit is attached to the contact area of the base unit by the binding area; and sides of the sensing unit and the base unit are flush with each other.

DETAILED DESCRIPTION OF THE PREFERRED EMBODIMENT

Figure 1:
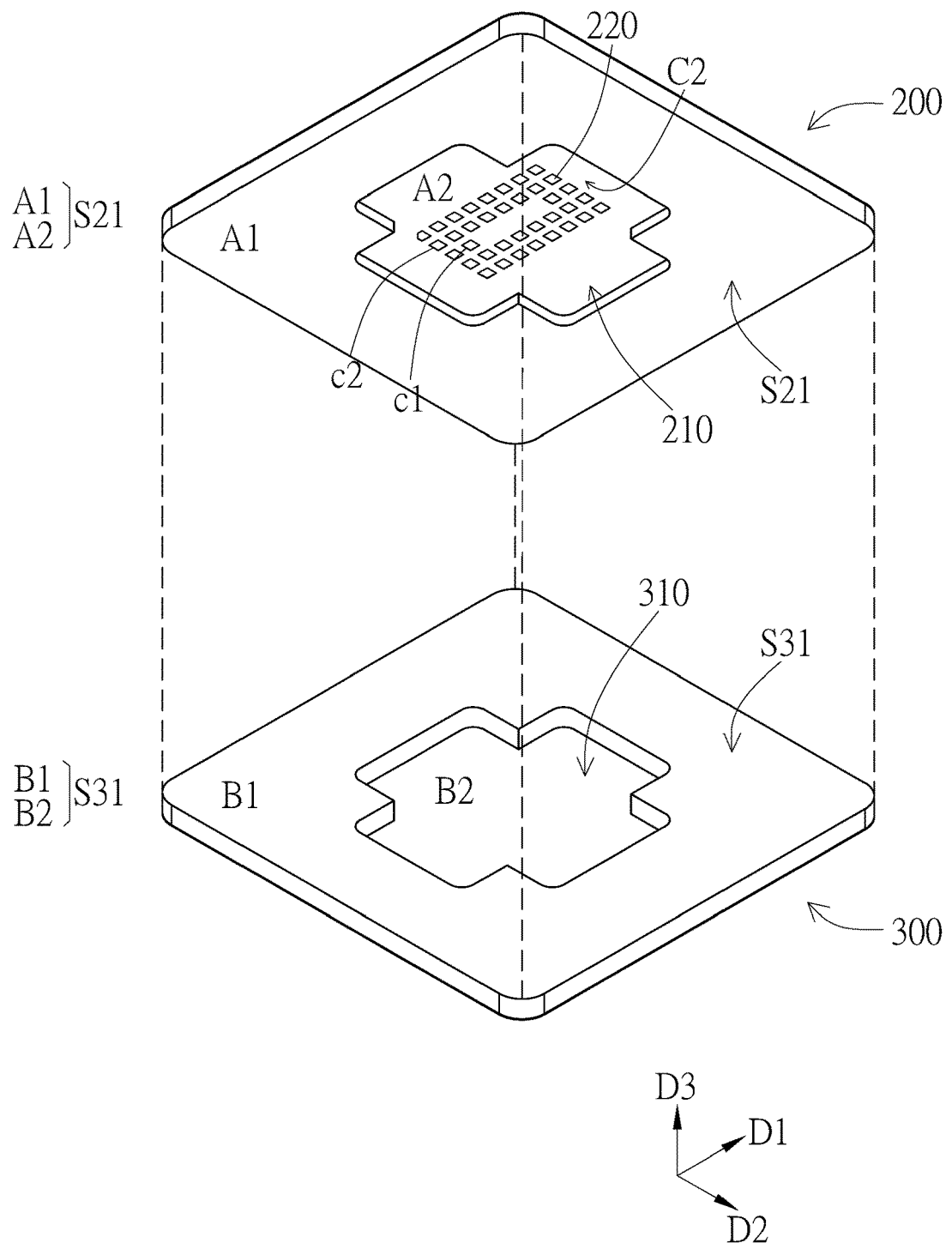
FIG. 1 illustrates an exploded schematic view of a keycap according to an embodiment of the present invention.
Figure 2:
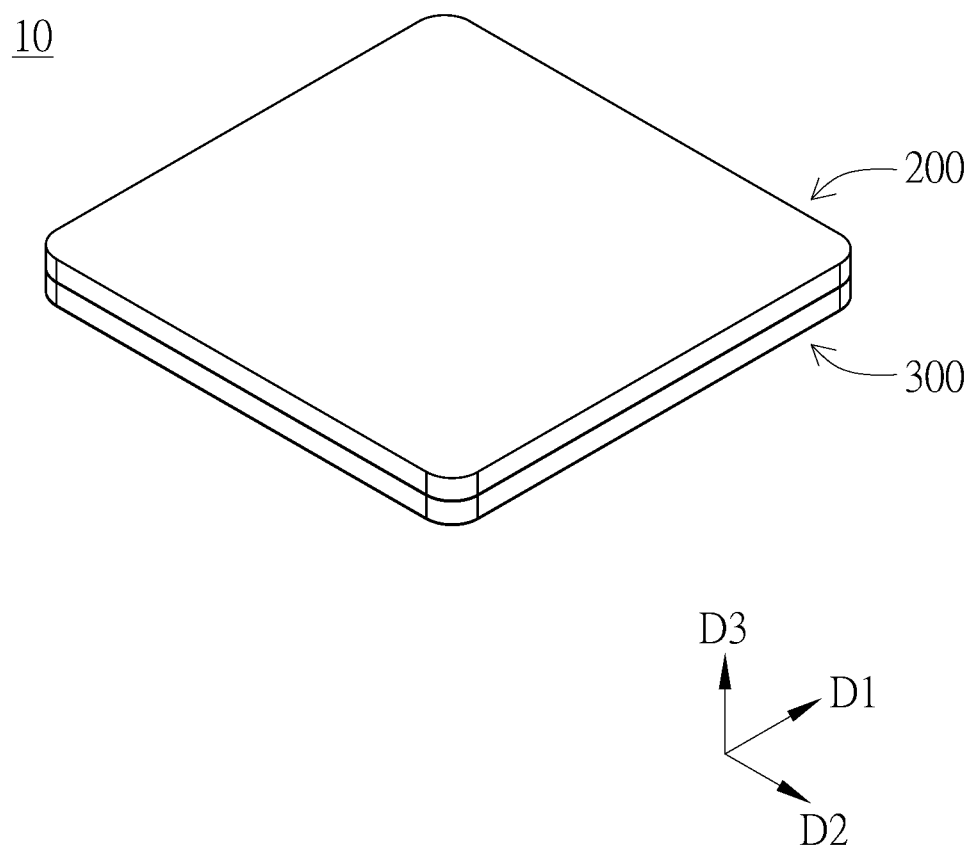
FIG. 2 illustrates a three-dimensional schematic view of a keycap of FIG. 1.

The present invention provides a sensing device which can be implemented in the form of a keycap of a keyboard, a button of a mouse, or other housings of a keyboard or electronic device. FIG. 1 illustrates an exploded schematic view of a keycap 10 according to an embodiment of the present invention; FIG. 2 illustrates a three-dimensional schematic view of the keycap 10 of FIG. 1. In this embodiment, as shown in FIG. 1 and FIG. 2, the keycap 10 can function as a sensing device and includes a sensing unit 200 and a base unit 300. From another aspect, FIG. 1 illustrates a sensing device 10, which can function as a keycap and includes a sensing unit 200 and a base unit 300.

It is noted that in various embodiments, the sensing device can be a functional component of the electronic device to provide the sensing function and other functions of the electronic device. In a preferred embodiment, the electronic device can be a laptop computer, desktop computer, mobile device or other electronic devices having sensing function. In a preferred embodiment, the sensing function is the biometrics (e.g. fingerprint) sensing and identification function. The sensing device is a functional component having the biometrics (e.g. fingerprint) sensing and identification function of the electronic device, such as a fingerprint sensor of a laptop computer. The sensing device also has other functions of the electronic device, such as a key-in function of a laptop computer.

It is noted that in a preferred embodiment, the keycap 10 is a functional component, which is adapted to provide the key-in function and other functions of the electronic device, such as the sensing function. In a preferred embodiment, the keycap 10 is one of the keycaps of an input device (e.g. keyboard) of the electronic device (e.g. laptop computer); the keycap 10 also has other functions, for example: sensing function of the laptop computer.

In addition, the sensing unit 200 includes a first sensing unit surface S21 (e.g. lower surface), and the first sensing unit surface S21 has a binding area A1 and a non-binding area A2. As shown in FIG. 1, the binding area A1 and the non-binding area A2 do not overlap with each other and correspond to each other in shape. In particular, the binding area A1 is the remaining area that the non-binding area A2 is deducted from the area covered by the first sensing unit surface S21. In other words, the area occupied by the binding area A1 and the area occupied by the non-binding area A2 together form the area of the first sensing unit surface S21, and the shape of the first sensing unit surface S21 is constituted by the binding area A1 and the non-binding area A2. It is noted that FIG. 1 shows exemplary shapes of the binding area A1 and the non-binding area A2, and in other embodiments, the binding area A1 and the non-binding area A2 can have different shapes according to the design requirements.

The base unit 300 includes a first base unit surface S31 (e.g. upper surface). The first base unit surface S31 has a contact area B1 and a non-contact area B2. As shown in FIG. 1, the contact area B1 and the non-contact area B2 do not overlap with each other and correspond to each other in shape. In particular, the contact area B1 is the remaining area that the non-contact area B2 is deducted from the area covered by the first base unit surface S31. In other words, the area occupied by the contact area B1 and the area occupied by the non-contact area B2 together form the area of the first base unit surface S31, and the shape of the first base unit surface S31 is constituted by the contact area B1 and the non-contact area B2. It is noted that FIG. 1 shows exemplary shapes of the contact area B1 and the non-contact area B2, and in other embodiments, the contact area B1 and the non-contact area B2 can have different shapes as appropriate.

The sensing unit 200 is attached to the contact area B1 of the base unit 300 by the binding area A1, as shown in FIG. 1. The sides of the sensing unit 200 and the base unit 300 are flush with each other. In particular, as shown in FIG. 2, after the sensing unit 200 and the base unit 300 are combined with each other, the appearance of the keycap 10 preferably looks like a single component.

Figure 3:
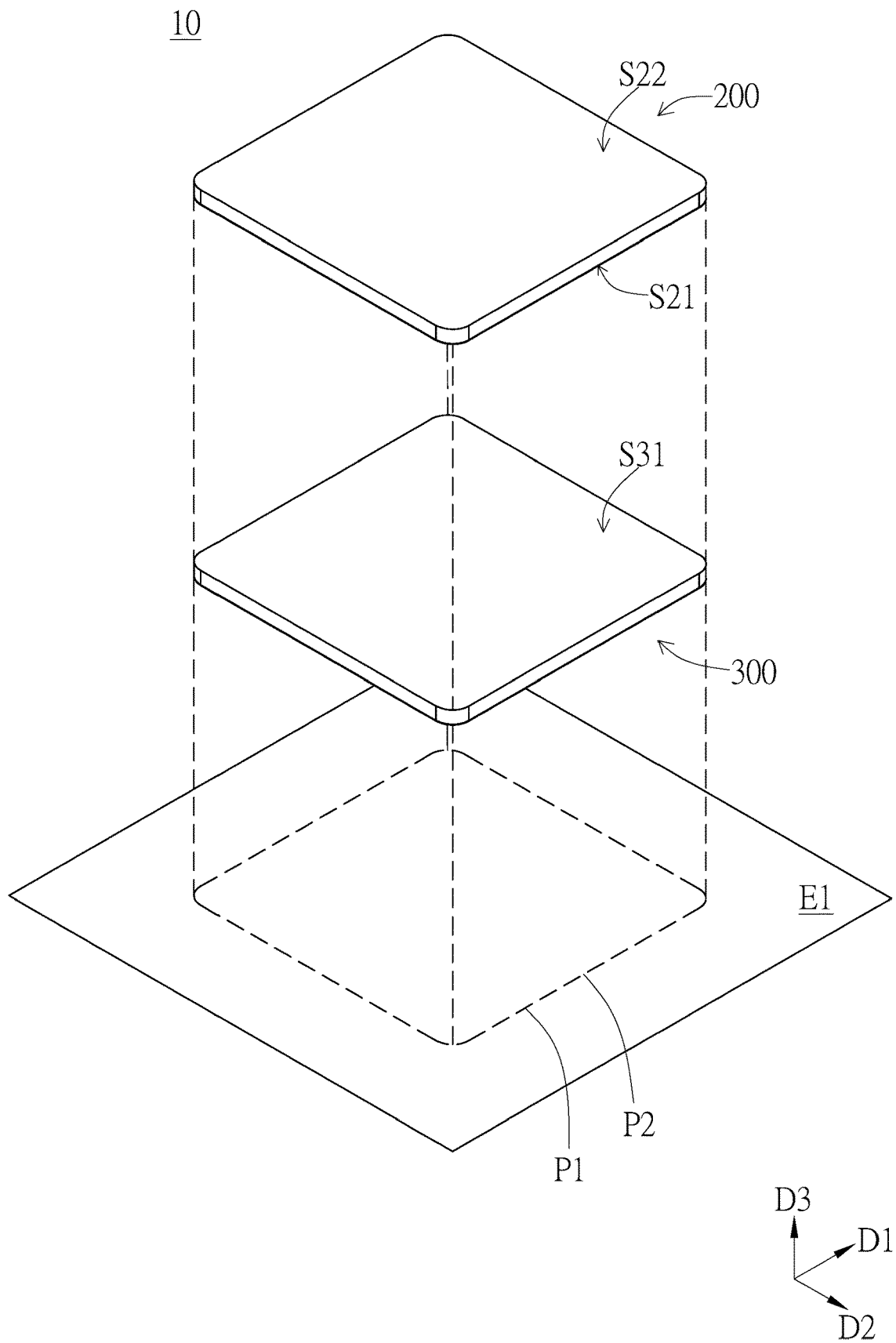
FIG. 3 illustrates a three-dimensional schematic view of a first vertical projection and a second vertical projection according to an embodiment of the present invention.

FIG. 3 illustrates a three-dimensional schematic view of a first vertical projection P1 and a second vertical projection P2 according to an embodiment of the present invention. As shown in FIG. 3, the sensing unit 200 has a first vertical projection P1 on a virtual plane E1, which is parallel to the first sensing unit surface S21, and the base unit 300 has a second vertical projection P2 on the virtual plane E1. In particular, the virtual plane E1 is parallel to the extending plane of the first sensing unit surface S21 and the extending plane of the first base unit surface S31 (e.g. parallel to the plane constituted by the axes D1 and D2). On the virtual projection plane E1, the first vertical projection P1 substantially completely overlaps with the second vertical projection P2. In other words, the first sensing unit surface S21 of the sensing unit 200 and the first base unit surface S31 of the base unit 300 substantially have the same shape and the same size when viewing from naked eyes.

Figure 4:
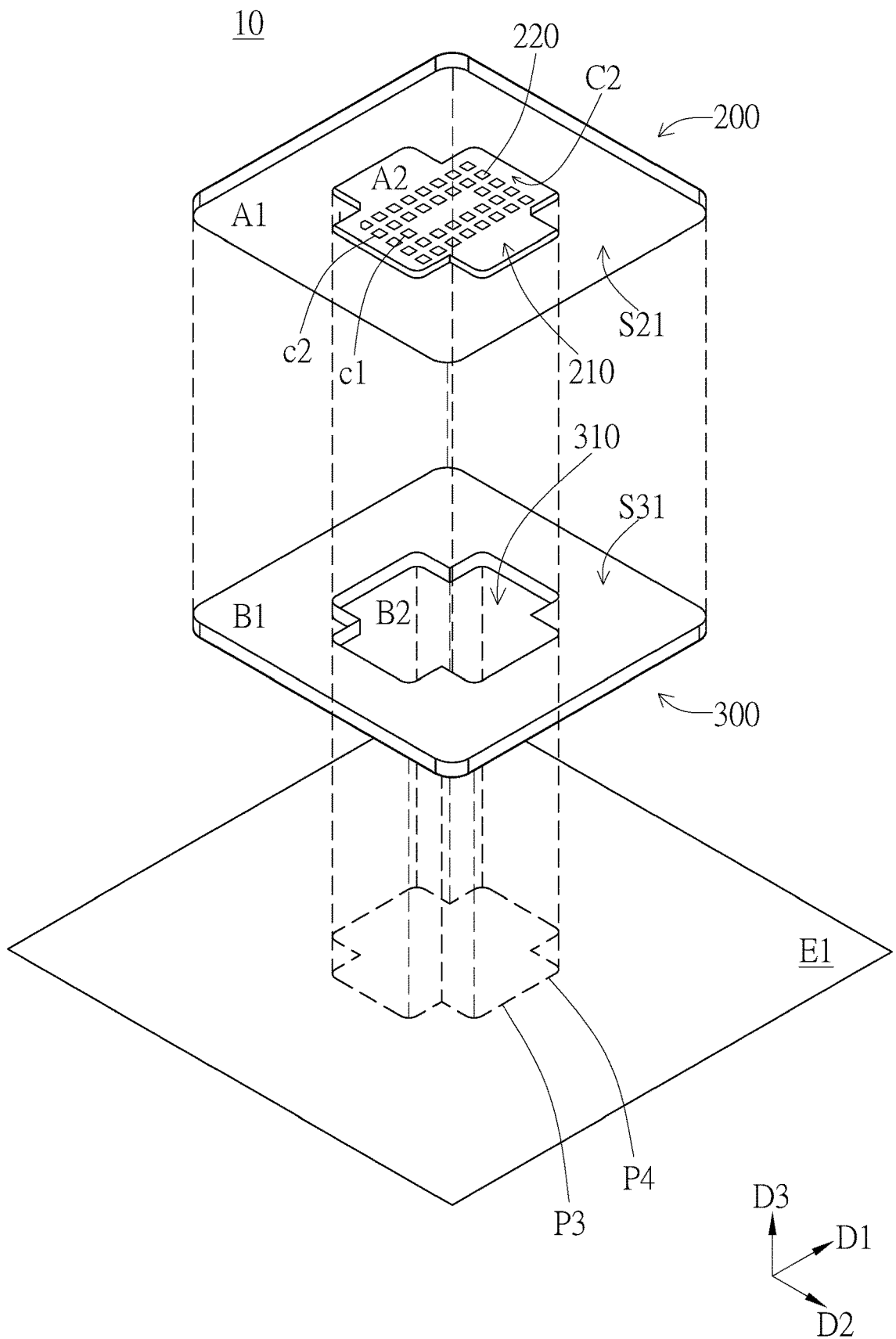
FIG. 4 illustrates a three-dimensional schematic view of a third vertical projection and a fourth vertical projection according to an embodiment of the present invention.

FIG. 4 illustrates a three-dimensional schematic view of a third vertical projection P3 and a fourth vertical projection P4 according to an embodiment of the present invention. As shown in FIG. 4, the non-binding area A2 has a third vertical projection P3 on the virtual plane E1, which is parallel to the first sensing unit surface S21, and the non-contact area B2 has a fourth vertical projection P4 on the virtual plane E1. In particular, the virtual plane E1 is parallel to the extending plane of the non-binding area A2 and the extending plane of the non-contact area B2 (e.g. parallel to the plane constituted by the axes D1 and D2). On the virtual plane E1, the third vertical projection P3 substantially completely overlaps with the fourth vertical projection P4. In other words, the non-binding area A2 of the sensing unit 200 and the non-contact area B2 of the base unit 300 substantially have the same shape and the same size when viewing from naked eyes.

Figure 5:
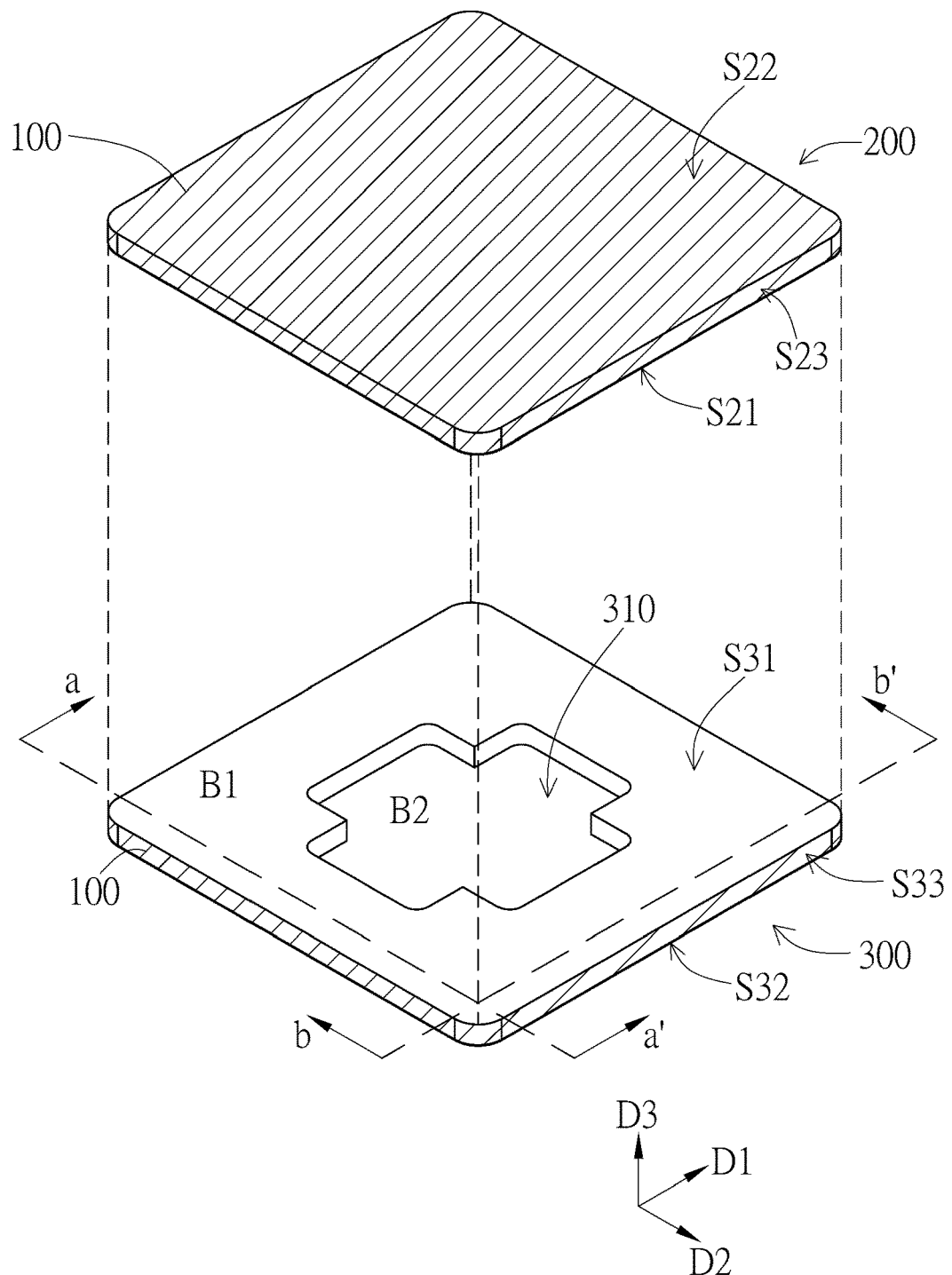
FIG. 5 illustrates an exploded schematic view of a keycap according to another embodiment of the present invention.
Figure 6A:
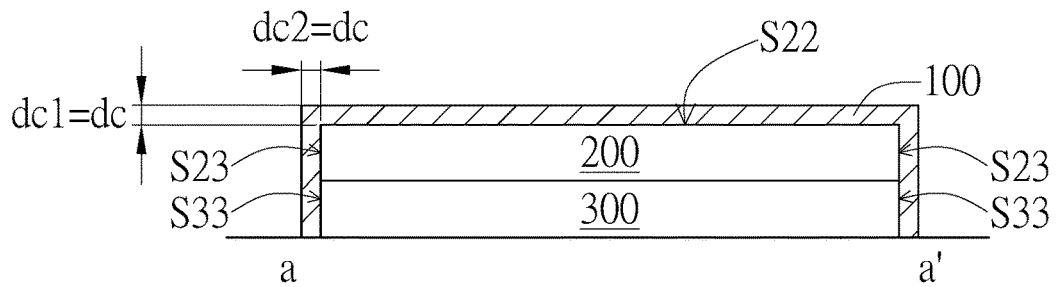
FIG. 6A and FIG. 6B illustrates cross-sectional schematic views of a keycap according to another embodiment of the present invention.
Figure 6B:
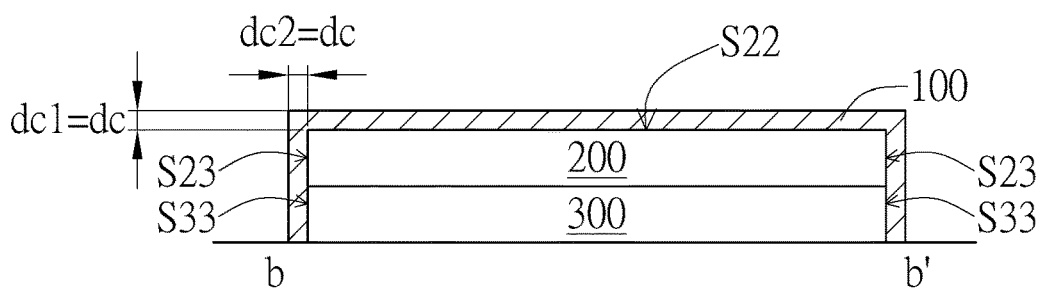

FIG. 5 illustrates an exploded schematic view of a keycap 10 according to another embodiment of the present invention; FIG. 6A and FIG. 6B illustrate cross-sectional schematic views of the keycap 10 according to another embodiment of the present invention. The difference between the embodiment shown in FIG. 5 to FIG. 6B and the embodiment shown in FIG. 1 to FIG. 4 is that the keycap 10 further includes a cover layer 100 in the embodiment shown in FIG. 5 to FIG. 6B. The cover layer 100 covers at least part of the sensing unit 200 and the base unit 300. Specifically, the sensing unit 200 of the keycap 10 further includes a second sensing unit surface S22 (e.g. upper surface) and a sensing unit side surface S23. As shown in FIG. 5, the second sensing unit surface S22 is opposite to the first sensing unit surface S21, and the second sensing unit surface S22 and the first sensing unit surface S21 are connected by the sensing unit side surface S23. The base unit 300 of the keycap 10 further includes a second base unit surface S32 (e.g. lower surface) and a base unit side surface S33. As shown in FIG. 5, the second base unit surface S32 is opposite to the first base unit surface S31, and the second base unit surface S32 and the first base unit surface S31 are connected by the base unit side surface S33. As shown in FIG. 5 to FIG. 6B, the cover layer 100 is disposed on the second sensing unit surface S22, the sensing unit side surface S23, and the base unit side surface S33. In other words, the cover layer 100 is disposed on the outer surface of the keycap 10, and the outer surface includes an upper surface formed by the second sensing surface S22 and a side surface formed by the sensing unit side surface S23 and the base unit side surface S33. In an embodiment, the cover layer 100 preferably has a thickness of 0.01~0.05 mm. For example, the thickness dc of the cover layer shown in FIGS. 6A and 6B is 0.01~0.05 mm. In a preferred embodiment, the cover layer 100 has a thickness of 0.03 mm. That is, the thickness dc of the cover layer shown in FIGS. 6A and 6B is preferably 0.03 mm.

The cover layer 100 distributed on the second sensing unit surface S22 (e.g. upper surface of the keycap 10) has a first cover layer thickness dc1. The cover layer 100 distributed on the sensing unit side surface S23 and the base unit side surface S33 (e.g. side surface of the keycap 10) has a second cover layer thickness dc2. It is noted that in the embodiment shown in FIG. 6A and FIG. 6B, the cover layer 100 on the second sensing unit surface S22 and the cover layer 100 on the sensing unit side surface S23 and the base unit side surface S33 have the same thickness. In other words, the first cover layer thickness dc1 is equal to the second cover layer thickness dc2, and the thicknesses dc1 and dc2 both are equal to the cover layer thickness dc. In other embodiments (not shown), the cover layer 100 on the second sensing unit surface S22 and the cover layer 100 on the sensing unit side surface S23 and the base unit side surface S33 can have different thicknesses according to the design requirements. In other words, the first cover layer thickness dc1 can be different from the second cover layer thickness dc2.

Figure 7:
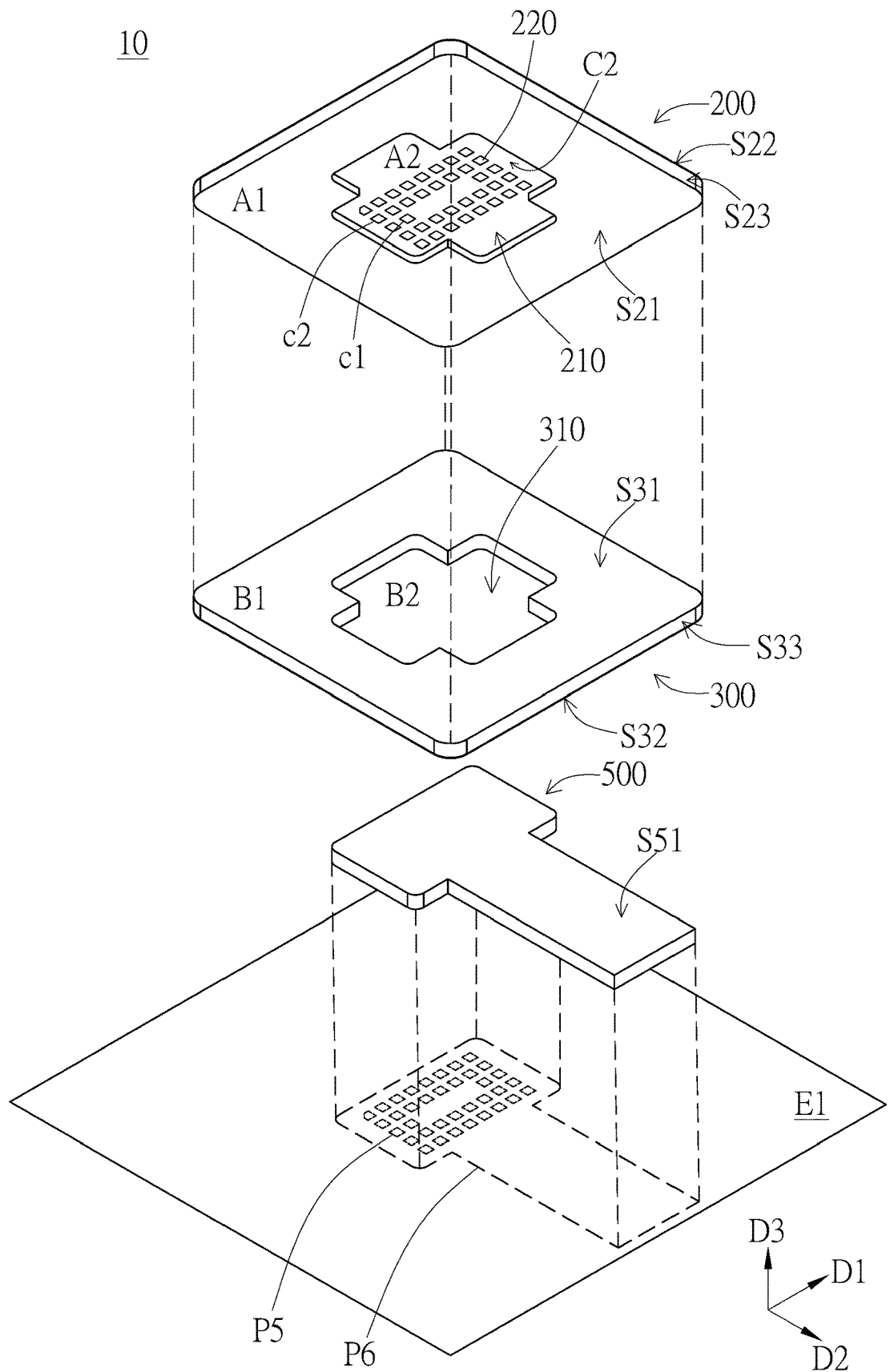
FIG. 7 illustrates an exploded schematic view of a keycap according to another embodiment of the present invention.

FIG. 7 illustrates an exploded schematic view of a keycap 10 according to another embodiment of the present invention. The difference between the embodiment of FIG. 7 and the embodiments of FIG. 1 to FIG. 6 is that the keycap 10 of FIG. 7 further includes a circuit board 500. Specifically, the sensing unit 200 of the keycap 10 further includes a sensing accommodation space 210 and a plurality of electrical contacts 220 accommodated in the sensing accommodation space 210. On the virtual plane E1 parallel to the first sensing unit surface S21, the electrical contacts 220 have a fifth vertical projection P5, and the circuit board 500 has a sixth vertical projection P6. In particular, the virtual plane E1 is parallel to the extending plane of the first sensing unit surface S21 and the extending plane of the first base unit surface S31 (e.g. parallel to the plane constituted by the axes D1 and D2). On the virtual plane E1, the vertical projections of the electrical contacts 220 (i.e., the fifth vertical projection P5) is located within the vertical projection of the circuit board 500 (i.e., the sixth vertical projection P6). In a preferred embodiment, the circuit board 500 is a flexible circuit board.

As shown in FIG. 7, the sensing unit 200 of the keycap 10 further includes an electrical contact distribution area C2 corresponding to the non-binding area A2. The sensing accommodation space 210 is recessed from the first sensing unit surface S21 to define the non-binding area A2 on the first sensing unit surface S21, and the electrical contact distribution area C2 is located within the non-binding area A2. In other words, the sensing accommodation space 210 is a recessed cavity on the first sensing unit surface S21 in the non-binding area A2.

As shown in FIG. 7, the base unit 300 of the keycap 10 further includes a second base unit surface S32 (e.g. lower surface) opposite to the first base unit surface S31 (e.g. upper surface). The base unit 300 has a base accommodation space 310. The base accommodation space 310 can be a through hole, which penetrates through the base unit 300 from the first base surface S31 to the second base unit surface S32 to define the non-contact area B2 on the first base unit surface S31. In other words, the non-contact area B2 can be a though hole or an opening penetrating through the base unit 300, so the circuit board 500 can be exposed to the electrical contacts 220 of the sensing unit 200 from the non-contact area B2.

Figure 8:
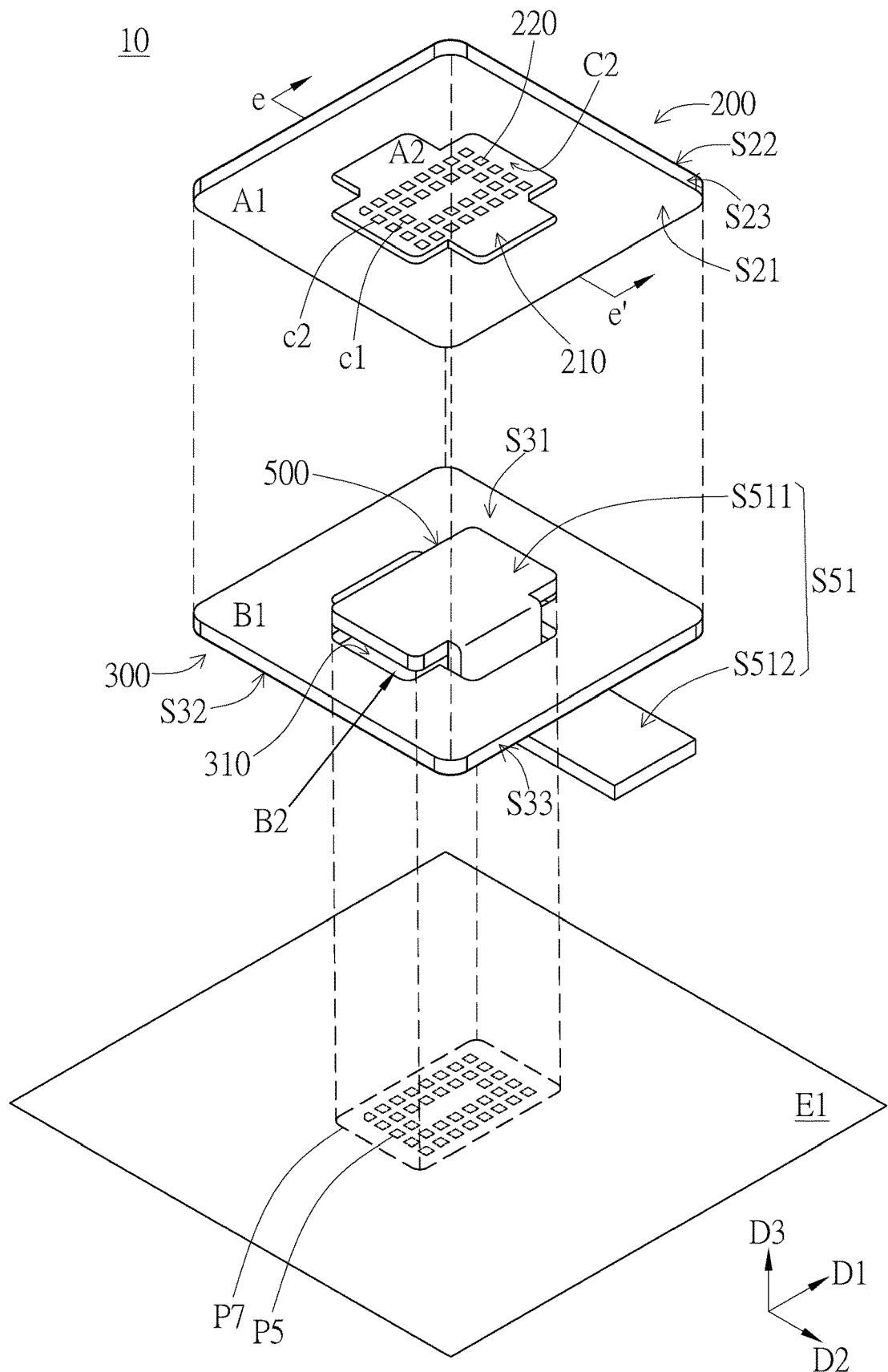
FIG. 8 illustrates a three-dimensional schematic view of a keycap according to another embodiment of the present invention.

FIG. 8 illustrates a three-dimensional schematic view of a keycap 10 according to another embodiment of the present invention. The difference between of the embodiment of FIG. 8 and the embodiment of FIG. 7 is that a portion of the circuit board 500 of FIG. 8 can be inserted into the base accommodation space 310 of the base unit 300 to be exposed and electrically connected to the sensing unit 200. The circuit board 500 of FIG. 8 further includes a first circuit board surface S51. The first circuit board surface S51 has an electrical connection area S511 and a non-electrical connection area S512. On the virtual plane E1 parallel to the first sensing unit surface S21, the electrical contacts 220 have a fifth vertical projection P5, and the electrical connection area S511 has a seventh vertical projection P7. In particular, the virtual plane E1 is parallel to the extending plane of the first sensing unit surface S21 and the extending plane of the first circuit board surface S51 (e.g. parallel to the plane constituted by the axes D1 and D2). On the virtual plane E1, the vertical projection of the electrical contacts 220 (i.e., the fifth vertical projection P5) is located within the vertical projection of the electrical connection area S511 (i.e., the seventh vertical projection P7).

The base unit 300 of FIG. 8 has a base accommodation space 310, and the electrical connection area S511 of the first circuit board surface S51 of the circuit board 500 is inserted into the base accommodation space 310 to be exposed from the first base unit surface S31, such that the electrical contacts 220 can be electrically connected to the electrical connection area S511.

In the embodiments, as shown in FIG. 7 and FIG. 8, the electrical contacts 220 are distributed in an inner circle c1 and an outer circle c2 in the electrical contact distribution area C2. In other embodiments, the electrical contacts 220 may be distributed in different ways according to the design requirements.

Figure 9:
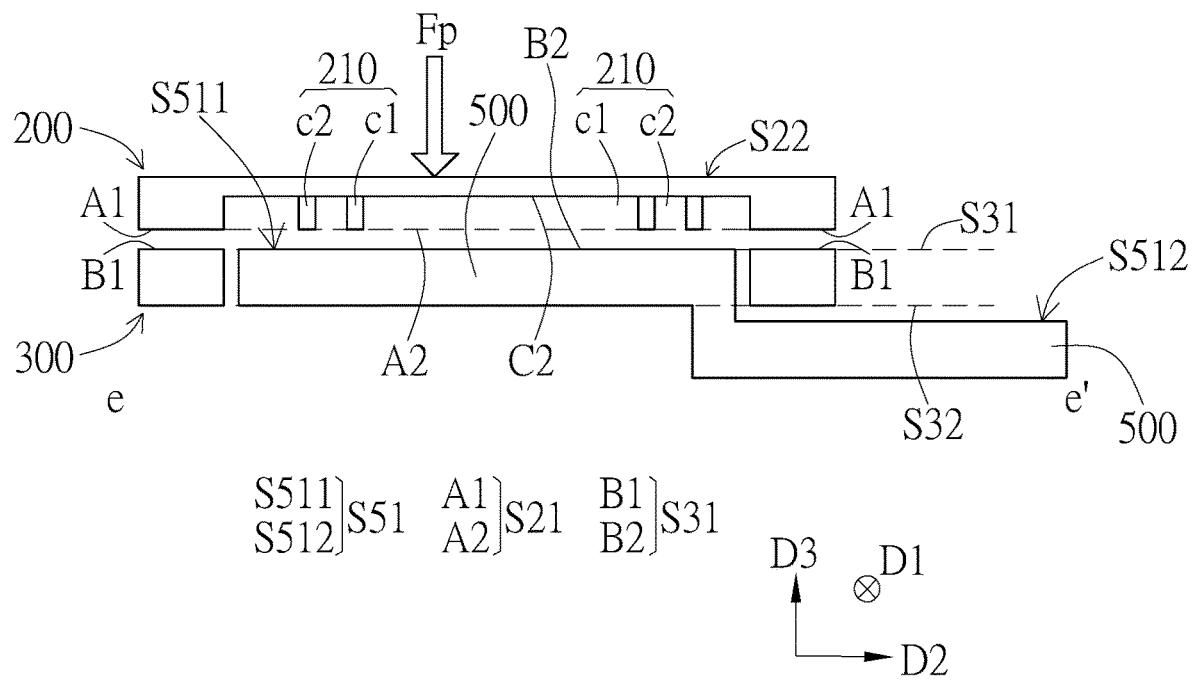
FIG. 9 illustrates cross-sectional schematic view of a keycap according to an embodiment of the present invention.

FIG. 9 illustrates a cross-sectional schematic view of a keycap 10 according to an embodiment of the present invention. In particular, FIG. 9 is a cross-sectional schematic view corresponding to the keycap 10 of FIG. 8. As shown in FIG. 9, in a preferred embodiment, when the pressing force Fp is applied to the second sensing unit surface S22 (i.e., the second sensing unit surface S22 is pressed), a biometric signal and a switch signal are transmitted to the circuit board 500. In a preferred embodiment, the biometric signal is a fingerprint recognition signal. In particular, when the user presses the sensing unit 200 with a finger, the second sensing unit surface S22 receives the pressing force Fp, and the electrical contacts 220 of the sensing unit 200 are electrically connected to the electrical connection area 511 of the circuit board 500, so that the biometric signal (e.g., fingerprint recognition signal) and the switch signal are generated and transmitted through the circuit board 500. In a preferred embodiment, the circuit board 500 further transmits the biometric signal (e.g., fingerprint recognition signal) and the switch signal to the processing unit (not shown) of the electronic device for biometric (e.g., fingerprint) recognition of the user and power-on/off of the electronic device.

In a preferred embodiment, the combination of the biometric (e.g. fingerprint) recognition function and the power-on/off function can be used to verify the user's identity and confirm which user has switched on or off the electronic device (not shown). In a preferred embodiment, the authorization of switching on/off the electronic device can be preset to prevent unauthorized users from switching on/off the electronic device or to prevent unauthorized users from impersonating other users (e.g., by stealing the administrator's account and password) to switch on/off the electronic device without authorization.

As shown in FIG. 9, in another preferred embodiment, when the pressing force Fp is applied to the second sensing unit surface S22, the biometric signals (e.g. fingerprint recognition signals) and the key-in signals are transmitted to the circuit board 500. Specifically, when the user presses the sensing unit 200 with a finger, the second sensing unit surface S22 receives the pressing force Fp, so the electrical contacts 220 of the sensing unit 200 are electrically connected to the electrical connection area 511 of the circuit board 500, and the biometric signal (e.g., fingerprint recognition signal) and the key-in signal are generated and transmitted through the circuit board 500. In a preferred embodiment, the circuit board 500 further transmits the biometric recognition signal (e.g., fingerprint recognition signal) and the key-in signal to the processing unit of the electronic device (not shown) for user's biometric (e.g. fingerprint) recognition and key-in of the electronic device.

In a preferred embodiment, the combination of the biometric (e.g., fingerprint) recognition function and the key-in function can be used to authenticate the user's identity and determine which user has operated the electronic device (not shown). In particular, when a user opens the text editor for text editing, without additional verification (e.g., digital signature), it can be known that which user types which texts. In a preferred embodiment, the key-in authorization can be preset to prevent unauthorized users from operating the electronic device or to prevent unauthorized users from impersonating other users (e.g., by stealing other users' account and password) to tamper the content of the editing file.

Figure 10:
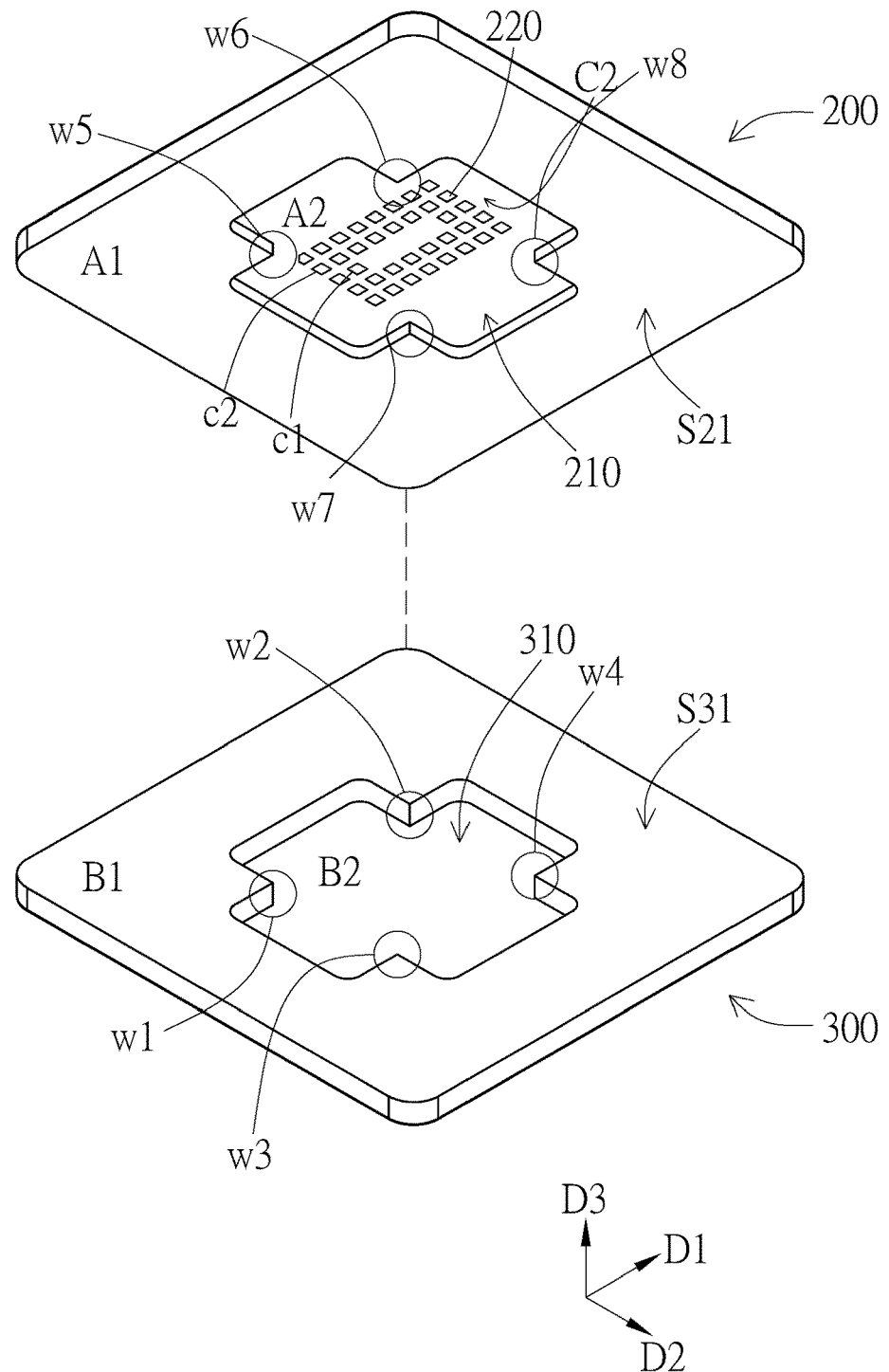
FIG. 10 illustrates a three-dimensional schematic view of a first concave angle to an eighth concave angle according to an embodiment of the present invention.

FIG. 10 illustrates a three-dimensional schematic view of a first concave angle w1 to an eighth concave angle w8 according to an embodiment of the present invention. In particular, the non-contact area B2 of the first base unit surface S31 of the base unit 300 has a first concave angle w1, a second concave angle w2, a third concave angle w3, and a fourth concave angle w4. The non-binding area A2 of the first sensing unit surface S21 of the sensing unit 200 has a fifth concave angle w5, a sixth concave angle w6, a seventh concave angle w7, and an eighth concave angle w8. The first concave angle w1, the second concave angle w2, the third concave angle w3, and the fourth concave angle w4 correspond to the fifth concave angle w5, the sixth concave angle w6, the seventh concave angle w7, and the eighth concave angle w8 in shape, respectively. In other words, the first concave angle w1 corresponds to the fifth concave angle w5 in shape; the second concave angle w2 corresponds to the sixth concave angle w6 in shape; the third concave angle w3 corresponds to the seventh concave angle w7 in shape; the fourth concave angle w4 corresponds to the eighth concave angle w8 in shape.

In a preferred embodiment, as shown in FIG. 10, the first concave angle w1, the second concave angle w2, the third concave angle w3, and the fourth concave angle w4 are right angles which are recessed toward the center of the non-contact area B2. The fifth concave angle w5, the sixth concave angle w6, the seventh concave angle w7, and the eighth concave angle w8 are corresponding right angles which are recessed toward the center of the non-binding area A2. In other embodiments, each concave angle (the first concave angle w1 to the eighth concave angle w8) can be any suitable angles, such as obtuse angle or acute angle according to design requirements.

Figure 11:
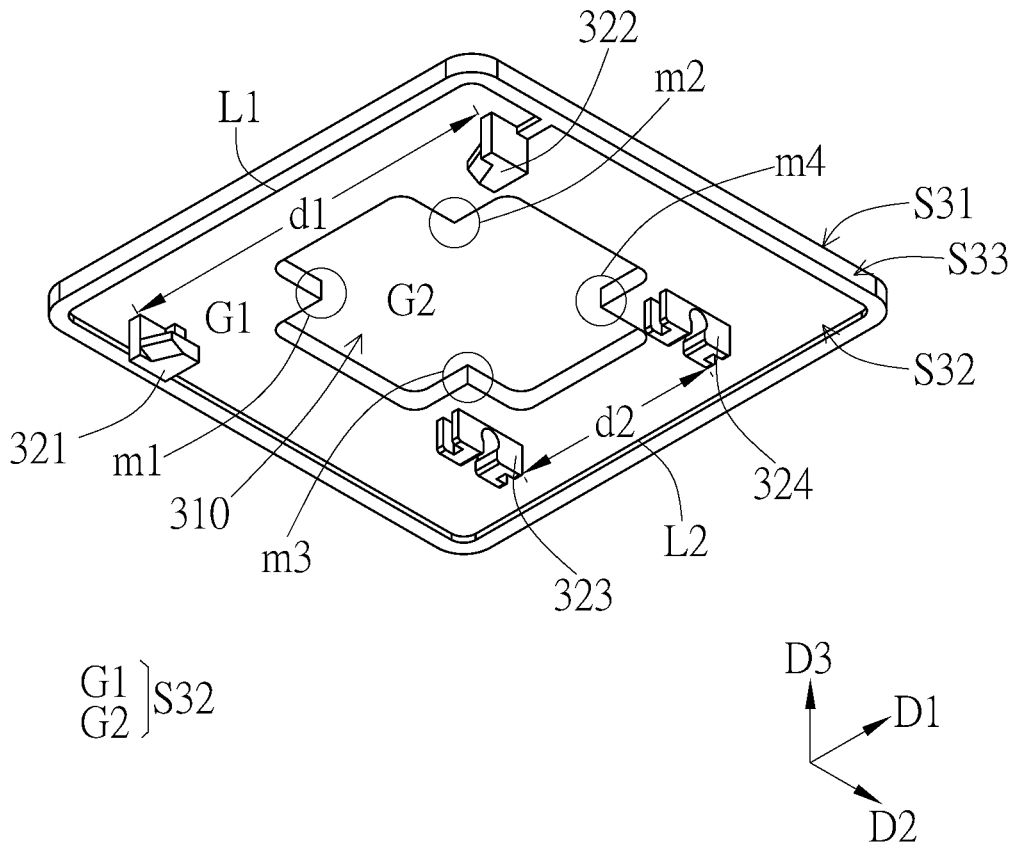
FIG. 11 illustrates a three-dimensional schematic view of a base unit according to an embodiment of the present invention.

FIG. 11 illustrates a three-dimensional schematic view of a base unit 300 according to an embodiment of the present invention. The base unit 300 further includes a first connection member 321, a second connection member 322, a third connection member 323, and a fourth connection member 324. The base unit 300 further has a second base unit surface S32 opposite to the first base unit surface S31. The second base unit surface S32 has a first side L1 and a second side L2 corresponding to the first side L1. In other words, the first side L1 and the second side L2 are disposed on two opposite sides of the second base unit surface S32, respectively.

As shown in FIG. 11, the first connection member 321 and the second connection member 322 are provided opposite to each other along a first direction D1 near the first side L1 of the second base unit surface S32. The third connection member 323 and the fourth connection member 324 are provided opposite to each other along the first direction D1 near the second side L2 of the second base unit surface S32. In other words, the first direction D1 is the direction from the first connection member 321 to the second connection member 322, or the first direction D1 is the direction from the third connection member 323 to the fourth connection member 324. As shown in FIG. 11, the first connection member 321 and the second connection member 322 are separated by a first distance d1; the third connection member 323 and the fourth connection member 324 are separated by a second distance d2. The first distance d1 is longer than the second distance d2.

As shown in FIG. 11, the second base unit surface S32 (e.g. lower surface) has a connection area G1 and a non-connection area G2. The connection area G1 and the non-connection area G2 do not overlap with each other and correspond to each other in shape. In particular, the non-connection area G2 is the remaining area that the connection area G1 is deducted from the area covered by the second base unit surface S32. In other words, the area occupied by the connection area G1 and the area occupied by the non-connection area G2 together form the area of the second base unit surface S32, and the shape of the second base unit surface S32 is constituted by the connection area G1 and the non-connection area G2.

As shown in FIG. 11, the connection area G1 has a first convex angle m1, a second convex angle m2, a third convex angle m3, and a fourth convex angle m4. In particular, the first convex angle m1 and the second convex angle m2 are located near the first side L1 of the connection area G1. The third convex angle m3 and the fourth convex angle m4 are located near the second side L2 of the connection area G1. The first direction D1 is the direction from the first convex angle m1 to the second convex angle m2, or the first direction D1 is the direction from the third convex angle m3 to the fourth convex angle m4.

Specifically, the first connection member 321 and the second connection member 322 are located near the first side L1 of the second base unit surface S32 and away from the first convex angle m1 and the second convex angle m2. That is, the first connection member 321 is not located at the first convex angle m1, and the second connection member 322 is not located at the second convex angle m2. The third connection member 323 and the fourth connection member 324 are located near the second side L2 of the second base unit surface S32 and close to the third convex angle m3 and the fourth convex angle m4, respectively. That is, the third connection member 323 and the fourth connection member 324 are preferably located at the third convex angle m3 and the fourth convex angle m4, respectively.

Figure 12A:
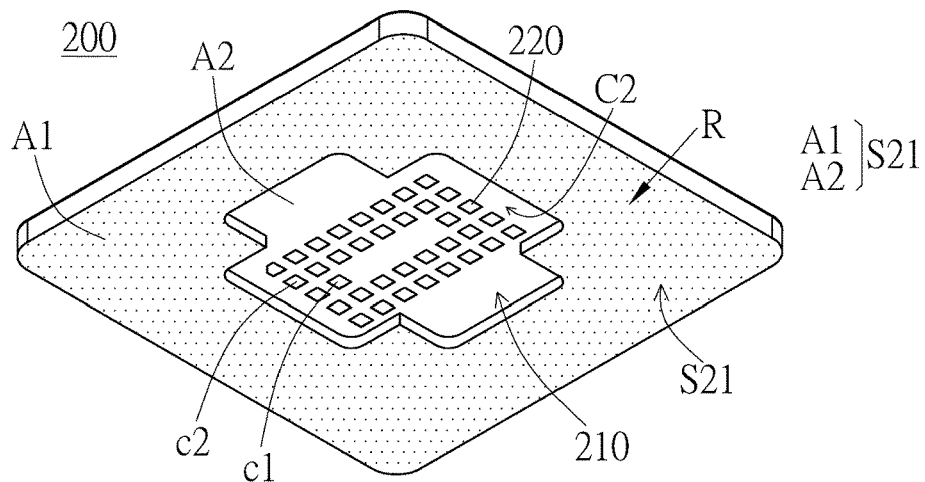
FIG. 12A to FIG. 12C illustrate three-dimensional schematic views of the sensing unit according to various embodiments of the present invention.
Figure 12B:
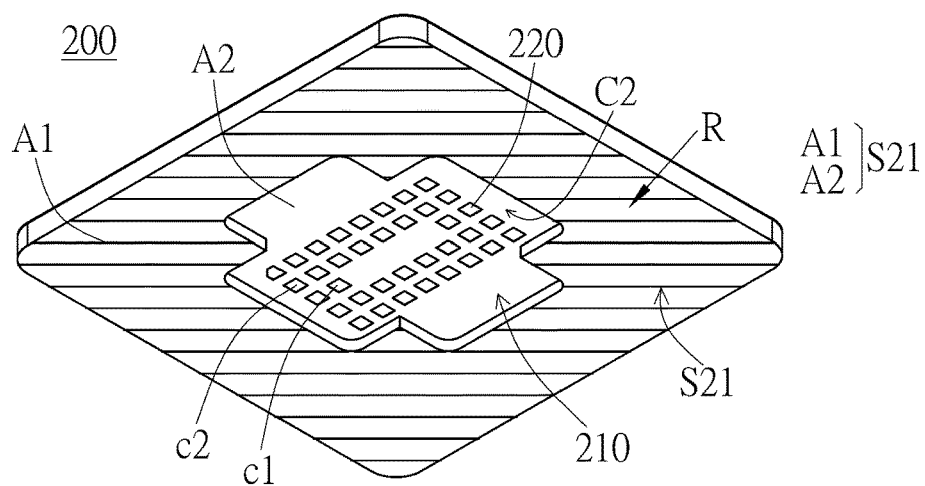
Figure 12C:
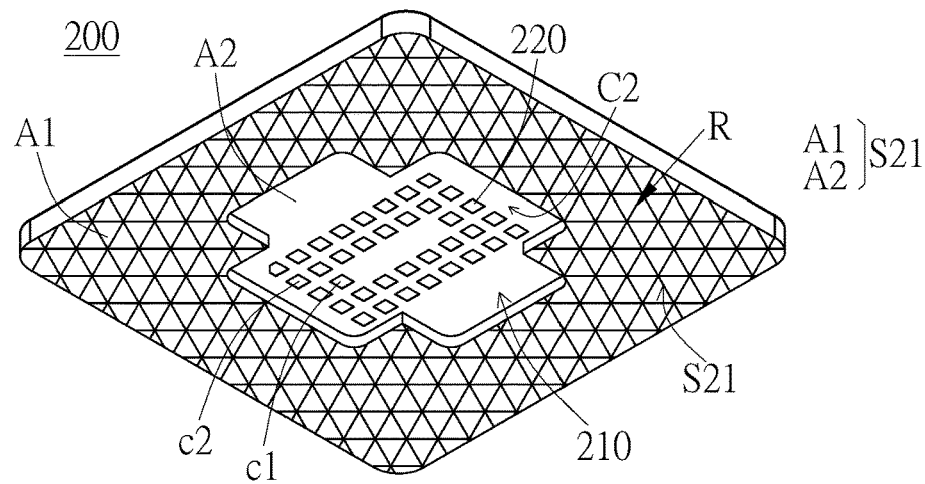

FIG. 12A to FIG. 12C illustrate three-dimensional schematic views of the sensing unit 200 according to various embodiments of the present invention. As shown in FIG. 12A to FIG. 12C, the binding area A1 of the first sensing unit surface S21 of the sensing unit 200 can have a rough surface R. In particular, before the sensing unit 200 is combined with the base unit 300, the area where the sensing unit 200 is to be bound with the base unit 300 (i.e., the binding area A1) can be roughened by using, for example, laser spotting (as shown in FIG. 12A), mechanical grinding (as shown in FIG. 12B and FIG. 12C), chemical etching (not shown), or the like, so that the binding area A1 becomes a rough surface R.

Figure 13:
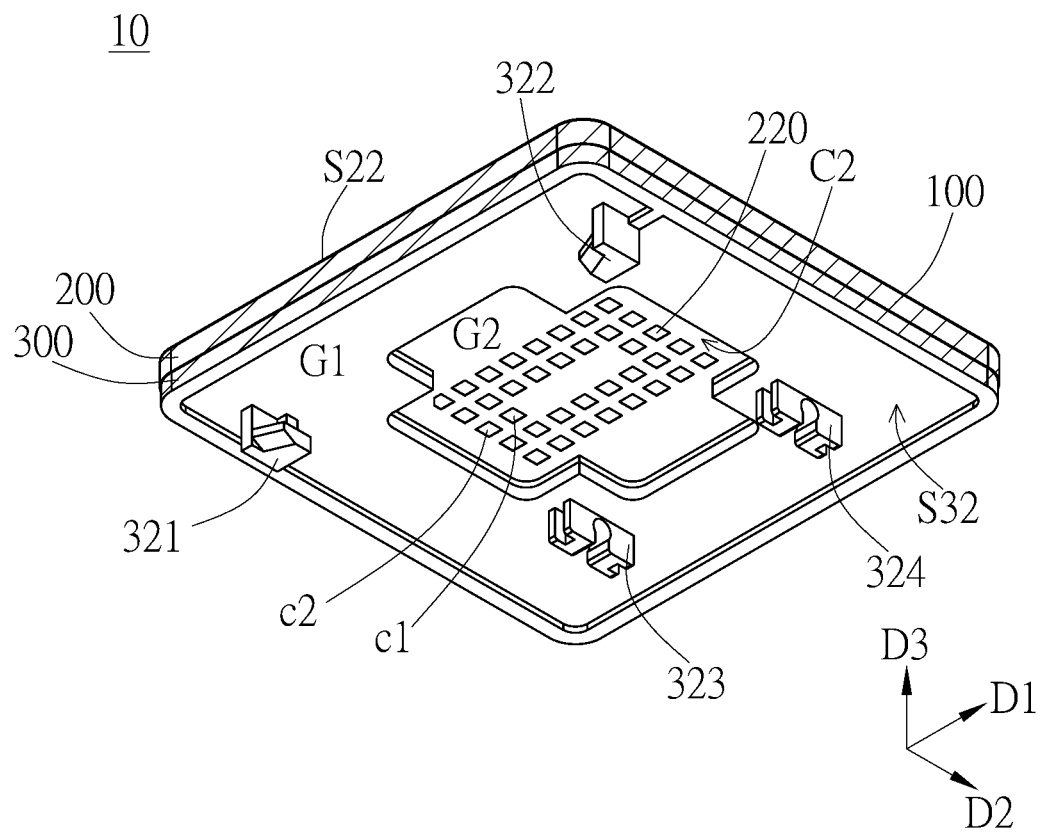
FIG. 13 illustrates a three-dimensional schematic view of a keycap according to another embodiment of the present invention.

FIG. 13 illustrates a three-dimensional schematic view of a keycap 10 according to another embodiment of the present invention. In particular, the keycap 10 of FIG. 13 is formed by combining the base unit 300 of FIG. 11 with the sensing unit 200 of any one of FIG. 12A to FIG. 12C and then coating the cover layer 100 on the surface of the sensing unit 200 and the base unit 300. In a preferred embodiment, the cover layer 100 can be colored paint. After the sensing unit 200 is combined with the base unit 300, a coating of desired color can be spray-coated on the second sensing unit surface S22 and the sensing unit side surface S23 of the sensing unit 200 and the base unit side surface S33 of the base unit 300, so that the appearance of the keycap 10 shows a customized color. In another embodiments, the cover layer 100 can be a protective coating. After the sensing unit 200 is combined with the base unit 300, a protective coating can be spray-coated on the second sensing unit surface S22 and the sensing unit side surface S23 of the sensing unit 200 and the base unit side surface S33 of the base unit 300, so that the keycap 10 can be wear-resistant and scratch-resistant to extend the usable lifetime of the keycap 10.

In another embodiment, the cover layer 100 can be a combination of colored paint and protective coating. For example, the colored paint is firstly spray-coated on the outer surface of the keycap 10 (e.g. the second sensing unit surface S22, the sensing unit side surface S23, and the base unit side surface S33), and then the protective coating is coated on the outer surface of the keycap 10 to protect the outer surface of the keycap 10 with the coated colored paint. For example, the cover layer 100 can be formed by three steps: (1) processing the outer surface of the keycap 10 (e.g. the second surface of the sensing unit S22, the side surface of the sensing unit S23, and the side surface of the base unit S33) to improve the adhesion of the coating on the surface of the keycap 10; (2) coating the desirable colored paint on the surface of the keycap 10 according to the design requirements, so the keycap 10 exhibits the desired color; and (3) coating a protective material to form the protective coating on the surface of the keycap 10, so the keycap 10 is wear-resistant and scratch-resistant.

The keycap 10 can be coupled to the electronic device (not shown) by means of various connection members of the base unit 300 (e.g. the first connection member 321, the second connection member 322, the third connection member 323, and the fourth connection member 324 shown in FIG. 11 and FIG. 13). For example, the keycap 10 can be mounted on a laptop computer as one of the keys of the keyboard of the laptop computer, or the sensing device 10 can be attached to a desktop computer as one of the keys of the keyboard of the desktop computer.

It is noted that the configuration of the connection members of the base unit 300 in FIG. 11 to FIG. 13 is exemplary for the keycap 10 to be connected to the electronic device (not shown). In other embodiments, the shape and the position of the connection members can be modified according to the design needs.

The sensing unit 200 and the base unit 300 can be combined by an in-mold injection method or an adhesion method. The in-mold injection method can be referred to FIG. 14A to FIG. 14B and related paragraphs for details. The attachment method can be referred to FIGS. 15~16 and related paragraphs for details.

Figure 14A:
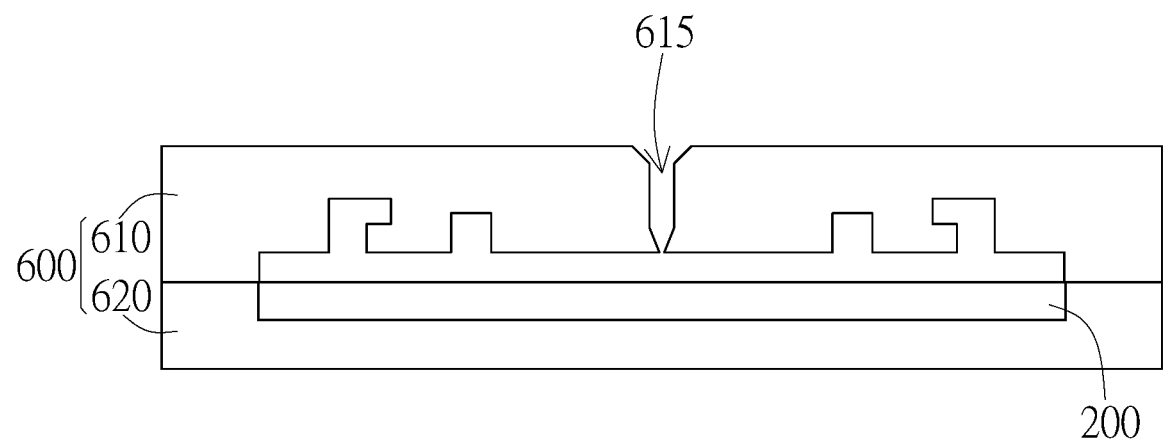
FIG. 14A and FIG. 14B illustrate cross-sectional schematic views of an injection mold according to an embodiment of the present invention.
Figure 14B:
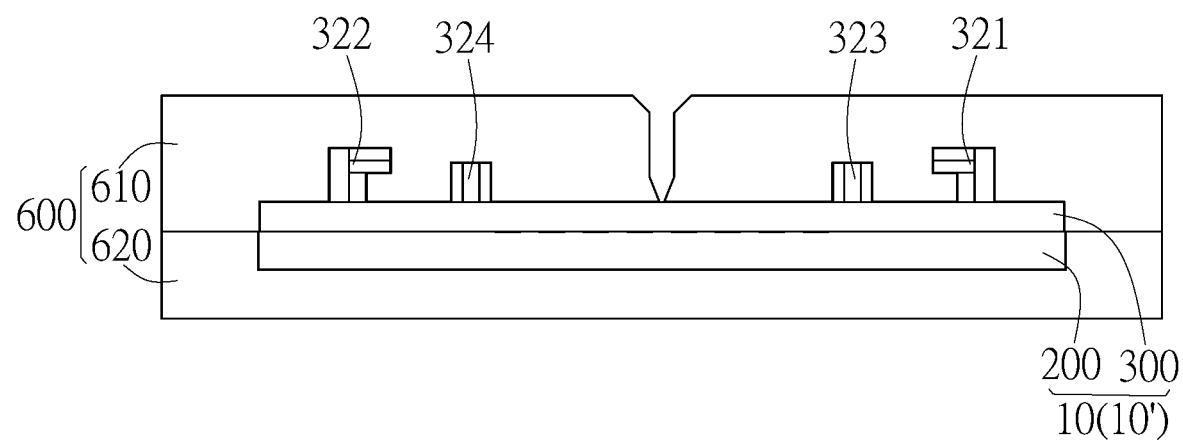

FIG. 14A and FIG. 14B illustrate cross-sectional schematic views of an injection mold 600 according to an embodiment of the present invention before injection and after injection, respectively. As shown in FIG. 14A and FIG. 14B, the sensing unit 200 and the base unit 300 are combined to form an integral body by the in-mold injection method. In particular, the injection mold 600 includes a first mold 610 and a second mold 620. The first mold 610 has an injection inlet 615 and a configuration adapted to define the base unit 300. The in-mold injection method for combining the sensing unit 200 and the base unit 300 includes the following processes. As shown in FIG. 14A, the sensing unit 200 is disposed on the second mold 620. As shown in FIG. 14B, after plastic particles are melted, the melted plastic is injected into the injection mold 600 from the injection inlet 615 to form the base unit 300 with the connection members (e.g. the first connection member 321, the second connection member 322, the third connection member 323 and the fourth connection member 324 shown in FIG. 14). After the plastic is cooled and shaped, the sensing unit 200 and the base unit 300 are combined into an integral body. After the injection mold 600 is removed, the sensing device (or keycap) 10 can be formed.

Figure 15:
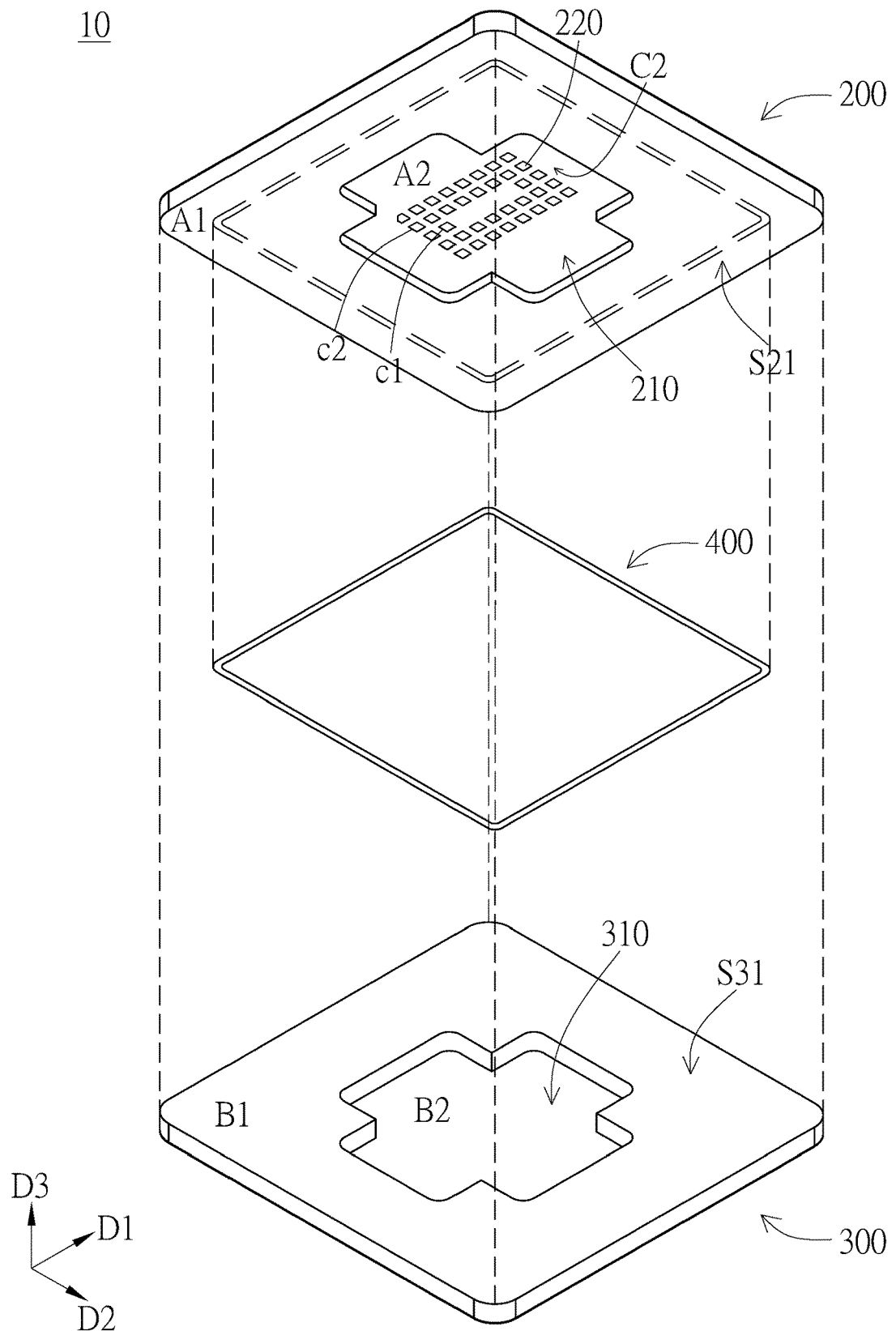
FIG. 15 illustrates a three-dimensional schematic view of a keycap and an adhesive layer according to an embodiment of the present invention.
Figure 16:
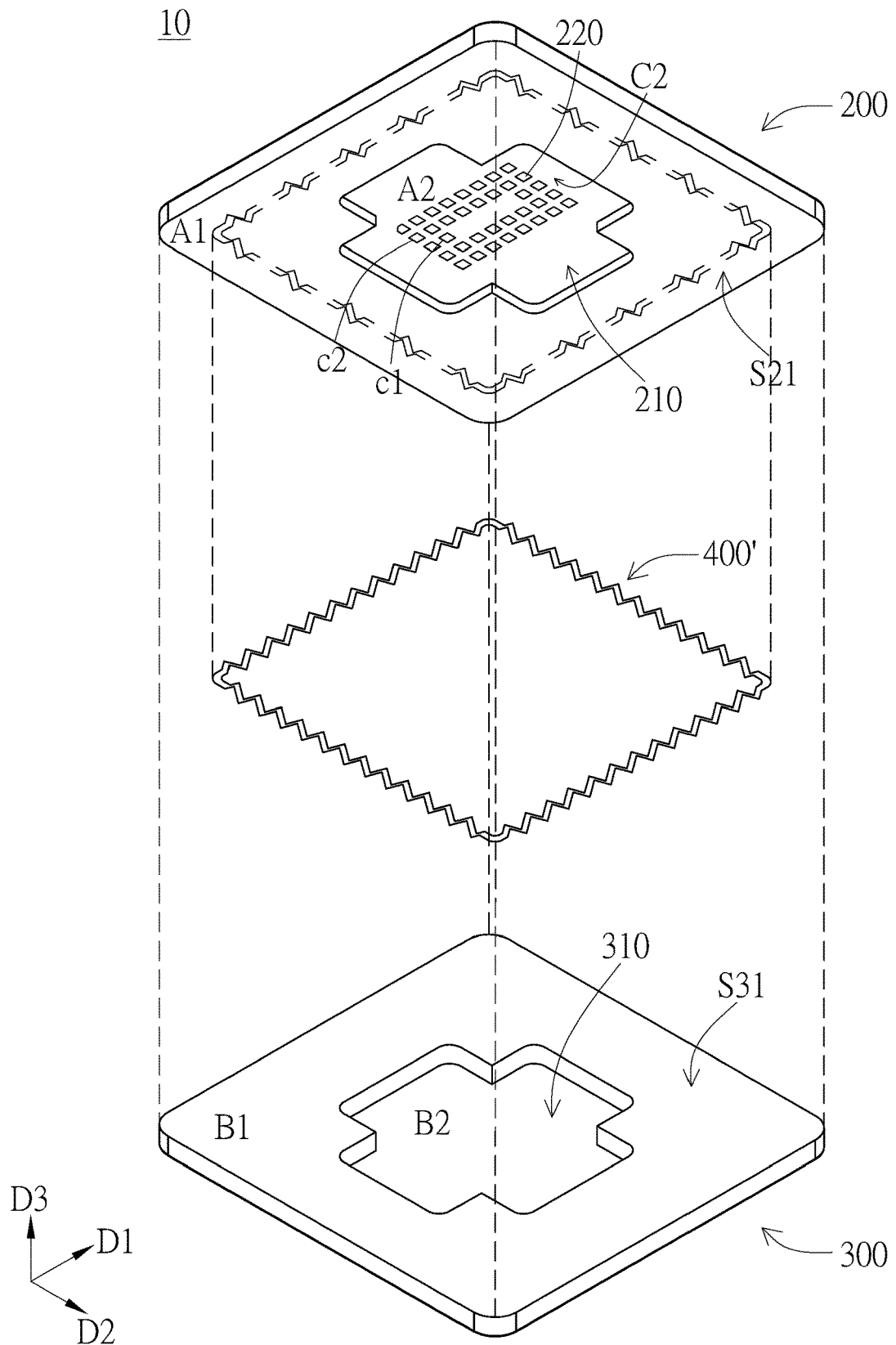
FIG. 16 illustrates a three-dimensional schematic view of a keycap and an adhesive layer according to another embodiment of the present invention.

FIG. 15 illustrates a three-dimensional schematic view of a keycap 10 and an adhesive layer 400 according to an embodiment of the present invention; FIG. 16 illustrates a three-dimensional schematic view of a keycap 10 and an adhesive layer 400' according to another embodiment of the present invention. In the embodiments shown in FIG. 15 and FIG. 16, the sensing unit 200 and the base unit 300 are formed as separate components, which are combined by adhesives. As shown in FIG. 15 and FIG. 16, an adhesive layer 400 (or an adhesive layer 400') is disposed between the sensing unit 200 and the base unit 300. The sensing unit 200 and the base unit 300 are combined by the adhesive layer 400 or 400'.

The difference between FIG. 15 and FIG. 16 is that the shapes of the adhesive layers 400 and 400' are different. For example, the adhesive layers 400 is formed as a smooth closed loop between the sensing unit 200 and the base unit 300, and the adhesive layer 400' is formed as a zigzag closed loop between the sensing unit 200 and the base unit 300, so the adhesive layer 400' has a larger distribution (adhesive) area, and the adhesion between the sensing unit 200 and the base unit 300 is enhanced.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:
1. A sensing device, comprising:
a sensing unit including a first sensing unit surface having a binding area and a non-binding area, wherein the binding area and the non-binding area do not overlap with each other and correspond to each other in shape, wherein the sensing unit further comprises a sensing accommodation space and a plurality of electrical contacts accommodated in the sensing accommodation space, and the sensing accommodation space is recessed from the first sensing unit surface to define the non-binding area;
a base unit including a first base unit surface having a contact area and a non-contact area, wherein the contact area and the non-contact area do not overlap with each other and correspond to each other in shape; and
a circuit board including a first circuit board surface having an electrical connection area and a non-electrical connection area, wherein on a virtual plane parallel to the first sensing unit surface, a vertical projection of the electrical connection area falls within a vertical projection of the non-binding area;
wherein the sensing unit is attached to the contact area of the base unit by the binding area; and
the sensing unit and the base unit correspond to each other in shape and size, so outermost sides of the sensing unit and the base unit are flush with each other.

2. The sensing device according to claim 1, further comprising a cover layer, wherein:
the sensing unit further comprises a second sensing unit surface and a sensing unit side surface, the second sensing unit surface is opposite to the first sensing unit surface, and the second sensing unit surface and the first sensing unit surface are connected by the sensing unit side surface;
the base unit further comprises a second base unit surface and a base unit side surface, the second base unit surface is opposite to the first base unit surface, and the second base unit surface and the first base unit surface are connected by the base unit side surface; and
the cover layer is disposed on the second sensing unit surface, the sensing unit side surface, and the base unit side surface.

3. The sensing device according to claim 2, wherein:
the cover layer has a thickness of 0.01~0.05 mm.

4. The sensing device according to claim 1, wherein:
on a virtual plane parallel to the first sensing unit surface, vertical projections of the electrical contacts fall within a vertical projection of the circuit board.

5. The sensing device according to claim 1, wherein:
the sensing unit further comprises an electrical contact distribution area corresponding to the non-binding area; and
the electrical contact distribution area is located within the non-binding area.

6. The sensing device according to claim 1, wherein the base unit further comprises a second base unit surface opposite to the first base unit surface, wherein:
the base unit has a base accommodation space; and
the base accommodation space is a through hole penetrating through the base unit from the first base unit surface to the second base unit surface to define the non-contact area on the first base unit surface.

7. The sensing device according to claim 1, wherein:
on the virtual plane, the vertical projections of the electrical contacts fall within a vertical projection of the electrical connection area; and
the base unit has a base accommodation space, the electrical connection area passes through the base accommodation space to be exposed from the first sensing unit surface, such that the electrical contacts are electrically connected to the electrical connection area.

8. The sensing device according to claim 5, wherein:
the electrical contacts are distributed in an inner circle and an outer circle in the electrical contact distribution area.

9. The sensing device according to claim 1, wherein:
the sensing unit further comprises a second sensing unit surface opposite to the first sensing unit surface; and
when a pressing force is applied to the second sensing unit surface, a fingerprint recognition signal and one of a switch signal and a key-in signal are transmitted to the circuit board.

10. The sensing device according to claim 1, wherein the base unit further comprises a first connection member, a second connection member, a third connection member, and a fourth connection member, the base unit further comprises a second base unit surface opposite to the first base unit surface, and the second base unit surface has a first side and a second side opposite to the first side, wherein:
the first connection member and the second connection member are provided opposite to each other along a first direction near the first side of the second base unit surface; and
the third connection member and the fourth connection member are provided opposite to each other along the first direction near the second side of the second base unit surface.

11. The sensing device according to claim 10, wherein:
the first connection member and the second connection member are separated by a first distance;
the third connection member and the fourth connection member are separated by a second distance; and
the first distance is longer than the second distance.

12. The sensing device according to claim 1, wherein:
the binding area has a rough surface.

13. The sensing device according to claim 1, wherein:
the sensing unit and the base unit are integrated by an in-mold injection method, or
the sensing unit and the base unit are combined with each other by an adhesive layer interposed between the sensing unit and the base unit.

14. The sensing device according to claim 1, wherein the sensing device functions as a keycap, an upper surface of the keycap entirely corresponding to the base unit in shape and size so outermost sides of the keycap and the base unit are flush with each other.

15. A sensing device, comprising:
a sensing unit having a binding area, a sensing accommodation space, and a plurality of electrical contacts accommodated in the sensing accommodation space, wherein the sensing accommodation space is a recessed space formed on a lower surface of the sensing unit;
a base unit having a contact area and a non-contact area; and
a circuit board having an electrical connection area and disposed corresponding to the non-contact area, wherein on a virtual plane parallel to the first sensing unit surface, a vertical projection of the electrical connection area falls within a vertical projection of the non-contact area,
wherein the sensing unit and the base unit are combined by connecting the binding area and the non-contact area, and the plurality of electrical contacts are electrically connected to the circuit board through the non-contact area; and
the sensing unit and the base unit correspond to each other in shape and size, so outermost sides of the sensing unit and the base unit are flush with each other.

16. The sensing device of claim 15, wherein the base unit further has at least one connection member disposed on a surface of the base unit facing away from the electrical contacts; the sensing device is coupled to an electronic device by the connection member.

17. The sensing device of claim 15, further comprising a cover layer, wherein the cover layer is disposed on an upper surface of the sensing unit and extends to cover a side surface of the sensing unit and a side surface of the base unit.

18. The sensing device of claim 15, wherein the non-contact area is a through hole penetrating through the base unit, and a portion of the circuit board is exposed to the electrical contacts from the non-contact area.

19. The sensing device of claim 15, wherein when the sensing unit receives a pressing force, a fingerprint recognition signal and one of a switch signal and a key-in signal are generated.

20. The sensing device of claim 15, wherein the sensing device functions as a keycap, an upper surface of the keycap entirely corresponding to the base unit in shape and size so outermost sides of the keycap and the base unit are flush with each other.

\* \* \* \* \*